(12) United States Patent
Giovannini et al.

(10) Patent No.: US 10,549,304 B2
(45) Date of Patent: Feb. 4, 2020

(54) APPARATUS AND METHOD FOR CLEANING AND FOR RECOVERING PAINT IN PAINTING MACHINES

(71) Applicant: CEFLA SOCIETÁ COOPERATIVA, Imola (BO) (IT)

(72) Inventors: Cristian Giovannini, Imola (IT); Cristian Pungetti, Imola (IT); Luigi Franzoni, Imola (IT)

(*) Notice: Subject to any disclaimer, the term of this patent is extended or adjusted under 35 U.S.C. 154(b) by 216 days.

(21) Appl. No.: 15/709,899

(22) Filed: Sep. 20, 2017

(65) Prior Publication Data

US 2018/0078965 A1 Mar. 22, 2018

(30) Foreign Application Priority Data

Sep. 21, 2016 (IT) .................. 102016000094514

(51) Int. Cl.
| | | |
|---|---|---|
| *B65G 45/10* | (2006.01) | |
| *B05B 14/20* | (2018.01) | |
| *B65G 45/26* | (2006.01) | |
| *B65G 45/22* | (2006.01) | |
| *B65G 39/073* | (2006.01) | |
| *B65G 45/12* | (2006.01) | |
| *B65G 45/24* | (2006.01) | |

(52) U.S. Cl.
CPC .......... *B05B 14/20* (2018.02); *B65G 39/073* (2013.01); *B65G 45/12* (2013.01); *B65G 45/22* (2013.01); *B65G 45/24* (2013.01); *B65G 45/26* (2013.01)

(58) Field of Classification Search
CPC .................. B05B 14/20; B05B 14/10
See application file for complete search history.

(56) References Cited

U.S. PATENT DOCUMENTS 5,421,448 A * 6/1995 Falcioni .............. B05B 13/0221
 198/498
2014/0205743 A1 7/2014 Streit

FOREIGN PATENT DOCUMENTS

| EP | 0448080 | 9/1991 |
|---|---|---|
| EP | 1059249 | 12/2000 |
| WO | 2014072039 | 5/2014 |

* cited by examiner

*Primary Examiner* — Mikhail Kornakov
*Assistant Examiner* — Ryan L. Coleman
(74) *Attorney, Agent, or Firm* — Themis Law

(57) ABSTRACT

A system for recovering paint and cleaning in a painting machine having a conveying band for conveying panels to be painted includes a paint recovery unit for paint recovery having a reverse roller in contact with the conveying band, recovering paint sprayed on the conveying band, and a doctor blade scraping the reverse roller to recover paint for successive channelling to a tank; a cleaning unit having a cleaning roller, a drying blade, and an idle roller; a paint recovery unit provided as an independent unit; and a cleaning unit for the conveying band provided as an independent unit.

9 Claims, 3 Drawing Sheets

APPARATUS AND METHOD FOR CLEANING AND FOR RECOVERING PAINT IN PAINTING MACHINES

FIELD OF THE INVENTION

The present invention relates to the technical field of the machines for painting panels made of sundry materials (wood, glass, fibrocement, etc.). In particular, the invention relates to an extractable trolley for cleaning a panel conveying system and for recovering paint.

BACKGROUND OF THE INVENTION

Machines are known in the art having a cleaning unit, which may be accessed in different ways, either laterally or frontally. A unit having a frontal access causes a stop (with ensuing downtime) of the production line incorporating the machine, in order to access the unit.

In those machines, the functions of paint recovery and cleaning of the conveying band are combined. This entails a more cumbersome trolley, because generally each trolley comprises a recovery unit and a cleaning unit. Typically, such trolleys are extracted from the front of the painting machine.

Application EP1964794 by the same applicant describes a cleaning trolley wherein the functions of recovery and cleaning are combined in a unique trolley, typically having a frontal access. Such solution has the advantage of being compact, but requires to stop the production line (with downtime) in order to clean the recovery doctor blade working on the first roller of the system, in case of need of color change, when the recovery of the first color is required.

SUMMARY OF THE INVENTION

Aim of the present invention is providing a system in which the functions of recovery and cleaning are independent from each other, and a plurality of independent recovery units is available so that cleaning of one of those units may be performed without stopping the production line. Such system is preferably extracted from the side of the painting machine.

This object is achieved by an apparatus and a method having the features described and claimed herein. Advantageous embodiments and refinements are further described and claimed herein.

A recovery and cleaning system according to the present invention comprises:
An independent recovery unit; and
A cleaning unit.

In one embodiment, a trolley according to the invention comprises two recovery units and one cleaning unit.

A method according to the present invention comprises the following steps:
Inserting a recovery and/or cleaning unit laterally with respect to a direction of forward motion of a panel;
Bringing the roller and doctor blade of each unit into contact with the conveying band to be cleaned;
Using the recovery and/or cleaning units for a desired time;
Interrupting the contact between roller and doctor blade on one side and conveying band on the other side;
Laterally extracting the single unit from the painting machine.

All of these operations can be performed while the machine for applying paint continues the painting of panels.

A first advantage of the present invention is avoiding the downtime connected to cleaning and maintenance operations. This advantage is particularly interesting in complex production lines comprising a plurality of painting machines placed in series.

A second advantage is providing a modular solution to the problem, which allows providing machines with a number of recovery units independent from the number of cleaning units. Both of these modular units can be present in the painting machine in a desired number, so as to comply with any requirement of cleaning and paint recovery.

A third advantage is that the cleaning of the conveyor band by a human operator is easier and lighter. In this solution, the recovery unit only can be extracted from the painting machine, which is more maneuverable and easier to clean.

In one embodiment, the system comprises at least two independent paint recovering units and at least one independent cleaning unit, each of these units being mounted on a separate independent structure such as a trolley or a carriage, which is displaceable in relation to the conveying belt, and each of the independent recovering units can be switched independently and together or alternatively from an active condition to an inactive condition of paint recovery from the conveying band.

In one embodiment, a control unit of the system is provided, which causes the conveyor band to continuously move and to switch only one of recovering units at the time in an active condition while maintaining the other in an active paint recovering condition.

BRIEF DESCRIPTION OF THE DRAWINGS

Further advantages and properties of the present invention are disclosed in the following description, in which exemplary embodiments of the present invention are explained in detail based on the drawings.

DETAILED DESCRIPTION OF EMBODIMENTS OF THE INVENTION

Figure 1:
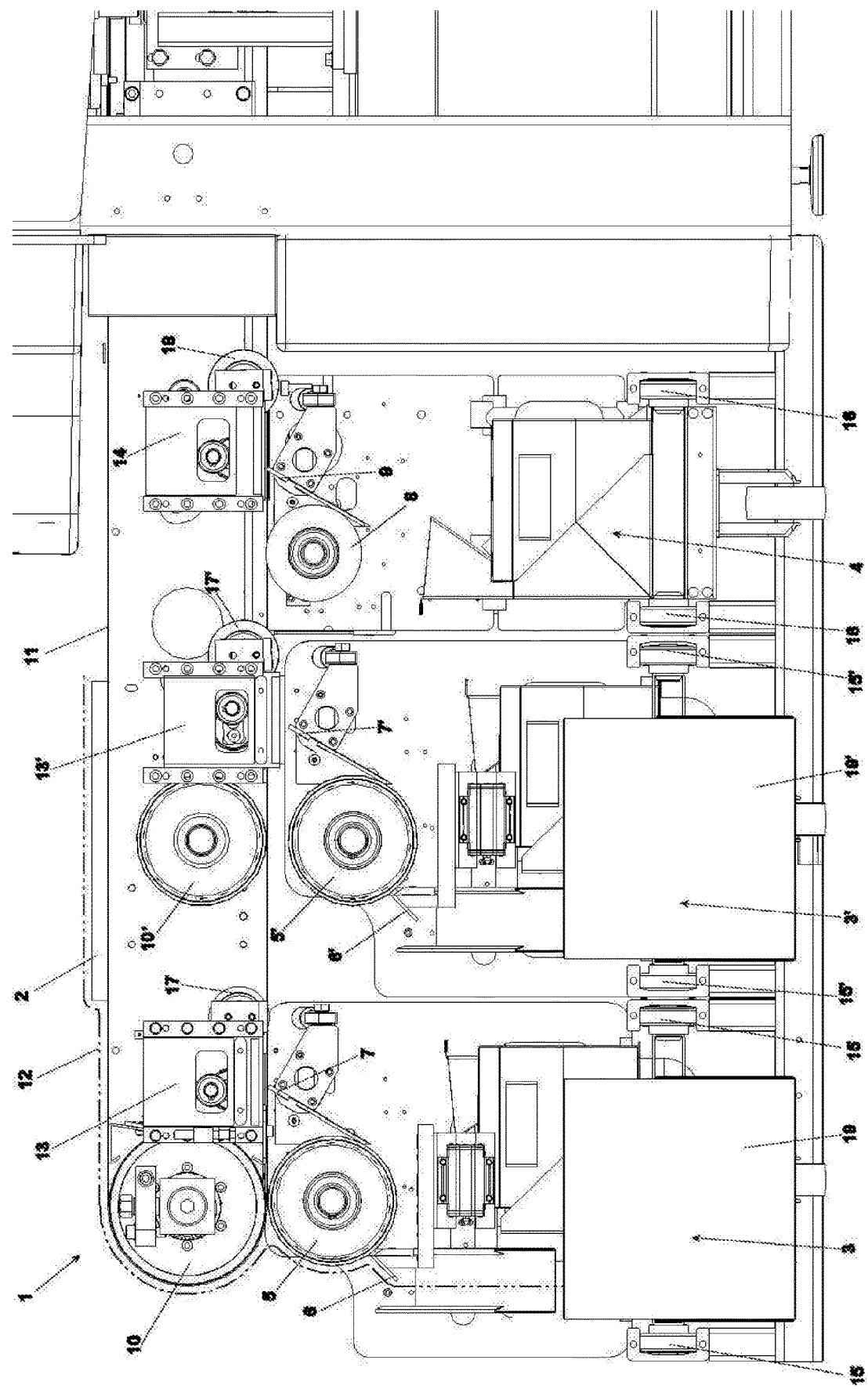
FIG. 1 depicts a side view of a system according to the invention that comprises two recovery trolleys and one cleaning trolley, wherein the first recovery unit is active.

FIG. 1 shows a preferred, but not limiting, embodiment, in which a painting machine 1 for panels comprises a first paint recovery unit 3, a second paint recovery unit 3', and a cleaning unit 4. A panel 2 to be painted is conveyed through a conveying band 11. Paint is applied to panel 12 through a spraying system, e.g. spraying guns, rotary bells, etc. A dotted line indicates sprayed paint 12.

It should be noted that cleaning trolley 3 is identical to the adjacent cleaning trolley 3': both are a module that can be repeated as many times as desired. The identity of the components is emphasized by the identity of the reference numbers.

In FIG. 1, the first recovery unit 3 is active: this can be noted by the fact that the first reverse roller 5 and the conveying band 11 fit together, while the second roller 5' and the conveying band 11 do not.

The recovery units 3 and 3' comprise each a reverse roller 5, 5', a recovery doctor blade 6, 6', a drying and solvent containment blade 7, 7', respectively. Numerals 10 and 10' indicate idle rollers of recovery units 3, 3', and 13, 13' indicate the lifting system of the recovery unit.

In the present description and in the claims, reverse roller means a roller rotating in a different direction with respect to the direction of forward motion of the conveying band, or whose circumferential surface moves in a direction opposed to that of the conveying band in correspondence of a tangent to said conveying band or to a plane parallel to said tangent.

Numerals 17, 17' indicate an idle roller placed on conveying band 11, providing improved efficacy in drying by blade 7, 7'.

Numerals 15 and 15' indicate a lateral extracting/inserting guide system for recovery units 3, 3'. Such system comprises a combination of lateral wheels pivoting around an axis substantially parallel to the longitudinal direction or of forward motion of said conveying band. Such wheels are part of a trolley dedicated for each of the two recovery units 3, 3'. Said wheels engage in two opposed parallel sliding guides, which are adjacent to every longitudinal side of recovery unit 3, 3'. This combination of extracting/inserting guides and trolley allows to perform a lateral movement for the extraction/insertion of said recovery units.

Other systems like slide or glide systems can be used as an alternative to the above-illustrated trolley.

A cleaning unit 4 comprises a cleaning roller 8, a drying blade 9, and an idle roller 17'. 14 indicates the lifting system of said cleaning unit.

Numeral 16 indicates a lateral extracting/inserting guide system for cleaning units 4, which is identical to the above-described extracting/inserting guide system for recovery units 3, 3'.

Numeral 18 indicates an idle roller providing improved efficacy in the drying performed by blade 9.

Recovery units 3, 3' and cleaning unit 4 can be active on conveying band 11 only if they fit together, having been lifted by lifting system 13, 13', 14, respectively.

In the present embodiment, idle roller 17' performs a double action: as idle roller for the drying generated by roller 7' and as idle roller for cleaning roller 8.

For the sake of simplicity, the circuit of the solvent was not shown in the present figures. Such circuit was described in EP1964794, and is not the object of the present application.

Figure 2:
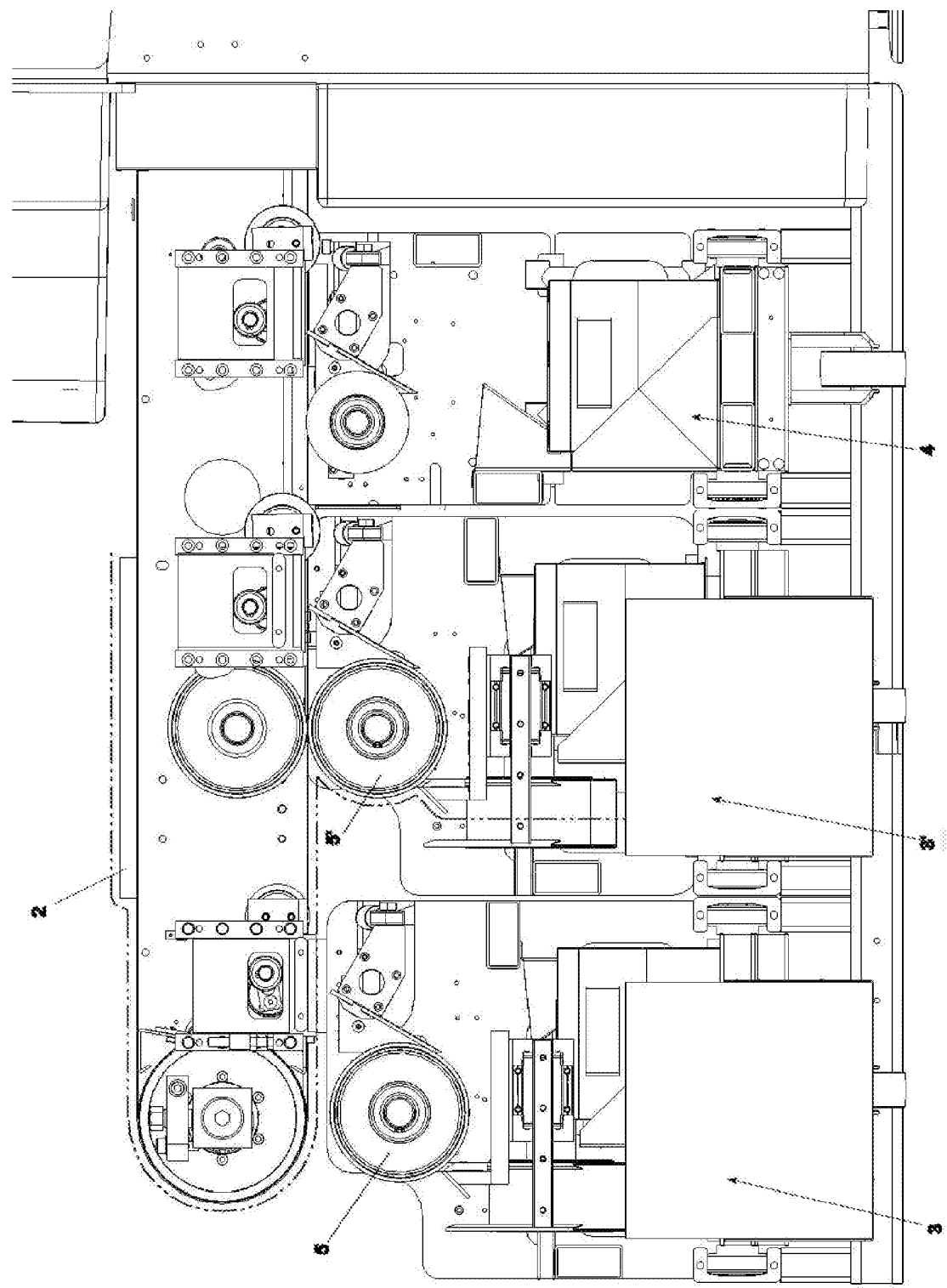
FIG. 2 depicts a side view of a system that comprises two recovery trolley and one cleaning trolley, wherein the second recovery unit is active.

FIG. 2 shows a painting machine 1 for panels 2 comprising a first paint recovery unit 3, a second paint recovery unit 3', and a cleaning unit 4, wherein the second recovery unit 3' is active. This can be noted by the fact that the second reverse roller 5' and the conveying band 11 fit together, while the first roller 5 and the conveying band 11 do not.

Figure 3:
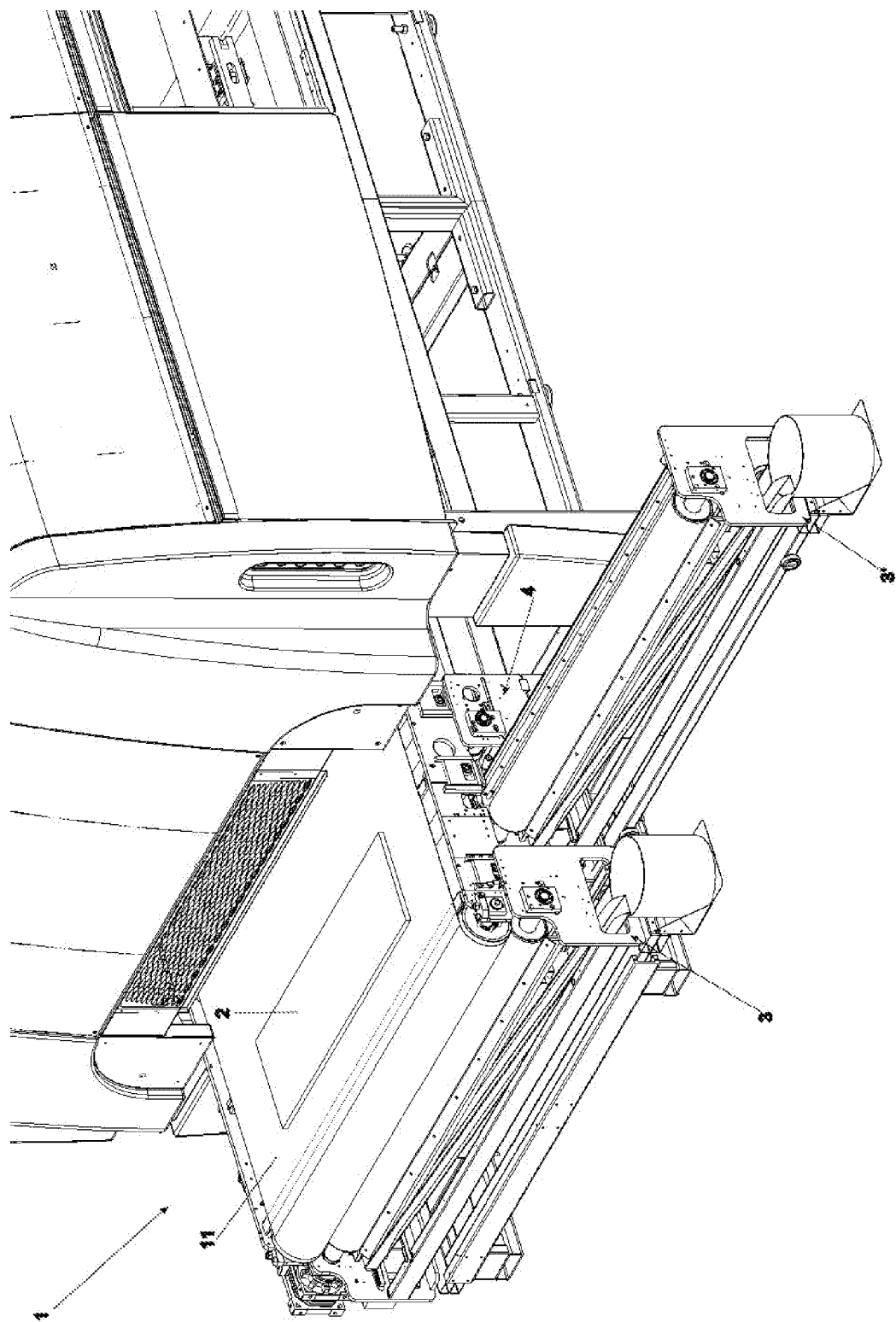
FIG. 3 depicts an axonometric view of the system of FIG. 1, wherein one of the two recovery units was extracted laterally for maintenance.

FIG. 3 shows a machine 1 for applying paint, which has the same configuration as in FIGS. 1 and 2. It comprises a first paint recovery unit 3, a second paint recovery unit 3', and a cleaning unit 4, wherein second recovery trolley 3' was extracted laterally with respect to the direction of forward motion of panels 2 to be painted in machine 1.

For example, the first recovery unit 3 always recovers white color, while the second recovery unit 3' always recovers different colors. Alternatively, the two recovery units 3 and 3' recover different colors.

The method for using painting machine 1 for painting panels 12 conveyed by a conveying band 11 comprises the following steps:

Laterally inserting a recovery unit 3 into machine 1 through inserting guides 15;

Lifting recovery unit 3 through lifting system 13, bringing its respective roller 5 into contact with conveying band 11 to be cleaned;

Using paint recovery unit 3 for a desired time;

Lowering recovery unit 3 through lifting system 13, bringing its respective roller 5 at a distance from conveying band 11 to be cleaned, when a change of paint is needed, while painting machine 1 continues its painting action;

Laterally extracting recovery unit 3 through extracting guides 15.

The above-explained method can be used in the same way for the at least one cleaning units 4, making use of respective extracting/inserting guides 16, and bringing leaning roller 8 into contact with conveying band 11.

In relation to the principle underlying the disclosed embodiments, it has to be noted that recovery units 3, 3' have a reverse roller 5, 5' which takes the paint or coating off the conveyor band onto their external surfaces and that a doctor blade 6 acting on the surface of roller 5, 5' scrapes the paint from the surface of rollers 5, 5' and convey this recovered paint into recovery tank 19. Differently, cleaning unit 4 provides for a cleaning roller 8 that has only the function of distributing a cleaning agent on the band which is scraped away from conveyor band 11 by doctor blade 9. As it appears from the figures, no doctor blade is necessary to cooperate with cleaning roller 8.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

LISTING OF REFERENCE NUMBERS

1 Painting machine
2 Panels to be painted
3 Recovery unit
4 Cleaning unit
5 Reverse roller
6 Recovery doctor blade
7 Drying blade
8 Cleaning roller
9 Drying blade
10 Idle roller
11 Conveying band
12 Sprayed paint
13 Lifting system for recovery unit
14 Lifting system for cleaning unit
15 Extracting/inserting guide system for recovery unit
16 Extracting/inserting guide system for cleaning unit
17 Idle roller
18 Idle roller
19 Recovery tank

The invention claimed is:

1. A system for recovering paint and for cleaning in a painting machine, the painting machine being provided with a conveying band for conveying panels to be painted in a longitudinal direction, the system comprising:

a paint recovery unit comprising a reverse roller in contact with the conveying band, wherein the reverse roller recovers paint sprayed on the conveying band, and wherein the paint recovery unit further comprises a doctor blade that scrapes the reverse roller such that paint scraped off the reverse roller is directed to a tank;

a cleaning unit comprising a cleaning roller, a drying blade, and an idle roller, wherein the cleaning unit is configured to contact and clean the conveying band;

wherein the paint recovery unit is part of a first independent unit that is configured to slide relative to the painting machine in a lateral direction that is perpendicular to the longitudinal direction, wherein the first independent unit is capable of being selectively slid into an operative position wherein the paint recovery unit's reverse roller is in a vertically aligned position with the conveying band, and wherein the first independent unit is capable of being selectively slid into a non-operative or resting position wherein the reverse roller is in a non-vertically aligned position with the conveying band; and wherein the cleaning unit is part of a second independent unit that is configured to slide relative to the painting machine in a lateral direction that is perpendicular to the longitudinal direction, and wherein the first independent unit and the second independent unit are capable of sliding independently of one another.

2. The system for recovering paint and cleaning in a painting machine according to claim 1, comprising at least two paint recovery units provided as the first independent unit and a supplemental recovery unit, and at least one cleaning unit provided as the second independent unit for said conveying band.

3. The system for recovering paint and cleaning in a painting machine according to claim 2, wherein the first independent unit and the cleaning unit work together while the supplemental recovery unit is in a resting position.

4. The system for recovering paint and cleaning in a painting machine according to claim 3, wherein sliding of first and/or second independent unit occurs through an extracting/inserting guide system comprising a combination of a trolley and a sliding guide of said trolley, which are independent for the paint recovery and cleaning units.

5. The system for recovering paint and cleaning in a painting machine according to claim 1, wherein the paint recovery unit and the cleaning unit are shiftable independently from each other with respect to the conveying band, wherein the wherein the first independent unit is capable of being selectively slid into an operative position wherein the paint recovery unit's reverse roller is in a vertically aligned position with the conveying band, and wherein the first independent unit is capable of being selectively slid into a non-operative or resting position wherein the reverse roller is in a position non-vertically aligned with the conveying band; and wherein the second independent unit is capable of being selectively slid into an operative position where the cleaning roller is in a vertically aligned position with the conveying band, and wherein the second independent unit is capable of being selectively slid into a non-operative or resting position.

6. The system for recovering paint and cleaning in a painting machine according to claim 1, wherein an idle roller is provided in correspondence of the reverse roller and on an opposite side of a side of the conveying band cleaned by the cleaning unit.

7. The system for recovering paint and cleaning in a painting machine according to claim 1, wherein an action of the paint recovery unit occurs when the reverse roller and the conveying band fit together due to a lifting of the paint recovery unit by a lifting system;

wherein an action of the cleaning unit occurs when the cleaning roller and conveying band fit together due to a lifting of the cleaning unit by a lifting system.

8. A method for paint recovery and cleaning of a painting machine comprising the following steps:

providing a system for recovering paint and for cleaning according to claim 1;

laterally inserting the paint recovery unit into the painting machine by sliding of a supporting trolley on a guide;

lifting the paint recovery unit through a lifting system, and bringing the reverse roller of the paint recovery unit into contact with the conveying band cleaned;

using the paint recovery unit for a period of time;

lowering the paint recovery unit through the lifting system, bringing the reverse roller at a distance form the conveying band cleaned, while the painting machine continues its painting action; and laterally extracting the paint recovery unit by shifting the trolley on the guide.

9. The method for paint recovery and cleaning of a painting machine according to claim 8, further comprising a step of employing the cleaning unit by making use of an extracting/inserting guide system of the cleaning unit, and bringing the cleaning roller into contact with the conveying band.

* * * * *